(12) United States Patent
Madasamy

(10) Patent No.: US 9,642,065 B2
(45) Date of Patent: May 2, 2017

(54) METHOD FOR MANAGING TRACKING AREA IDENTITY LIST AND USER EQUIPMENT USING THE SAME AND COMMUNICATION SYSTEM USING THE SAME

(71) Applicant: Acer Incorporated, New Taipei (TW)

(72) Inventor: Sathiyakeerthi Madasamy, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/226,848

(22) Filed: Mar. 27, 2014

(65) Prior Publication Data

US 2014/0295837 A1 Oct. 2, 2014

Related U.S. Application Data

(60) Provisional application No. 61/805,532, filed on Mar. 27, 2013.

(51) Int. Cl.
*H04W 4/00* (2009.01)
*H04W 48/04* (2009.01)
*H04W 8/06* (2009.01)
*H04W 60/00* (2009.01)

(52) U.S. Cl.
CPC .............. *H04W 48/04* (2013.01); *H04W 8/06* (2013.01); *H04W 60/00* (2013.01)

(58) Field of Classification Search
CPC .................................................... H04W 48/04
See application file for complete search history.

(56) References Cited

U.S. PATENT DOCUMENTS

2008/0102896 A1* 5/2008 Wang .................... H04W 36/34
455/560
2013/0157661 A1* 6/2013 Bhaskaran ............ H04W 60/00
455/436

FOREIGN PATENT DOCUMENTS

| CN | 101242353 | 8/2008 |
| CN | 101400041 | 4/2009 |
| CN | 101536560 | 9/2009 |

OTHER PUBLICATIONS

3GPP, "Non-Access-Stratum (NAS) protocol", 3GPP TS 24.301 V12.0.0, Mar. 2013, 1-343.

* cited by examiner

*Primary Examiner* — Idowu O Osifade
(74) *Attorney, Agent, or Firm* — Jianq Chyun IP Office

(57) ABSTRACT

The present disclosure proposes a method for managing a tracking area identity (TAI) list to be used by a user equipment (UE), a user equipment using the same, and a communication system using the same. The present disclosure would include a UE which stores a forbidden TAI list. A mobility management entity (MME) would transmit a first message which includes a TAI List to the UE. The UE would then determine whether the TAI list and the forbidden TAI list contain a first tracking area which is on both the TAI list and the forbidden tracking area list. If that is the case, the UE may either remove the first tracking area from the TAI list or the UE may remove the first track area from the forbidden tracking area list. After the revision of the TAI list is complete, the UE may synchronize the TAI with the MME.

11 Claims, 6 Drawing Sheets

Table 8.2.1.1: ATTACH ACCEPT message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | ⋮ | ⋮ | ⋮ | ⋮ | ⋮ |
|  | TAI list | Tracking area identity list 9.9.3.33 | M | LV | 7-97 |
|  | ⋮ | ⋮ | ⋮ | ⋮ | ⋮ |
| 5E | T3412 extended value | GPRS timer 3 9.9.3.16B | O | TLV | 3 |

201 { (bracketing TAI list row)

METHOD FOR MANAGING TRACKING AREA IDENTITY LIST AND USER EQUIPMENT USING THE SAME AND COMMUNICATION SYSTEM USING THE SAME

CROSS REFERENCE TO RELATED APPLICATION

This application claims the priority benefit of U.S. provisional application Ser. No. 61/805,532, filed on Mar. 27, 2013. The entirety of the above-mentioned patent application is hereby incorporated by reference herein and made a part of specification.

TECHNICAL FIELD

The present disclosure directs to a method for managing tracking area identity list to be used by a user equipment and a user equipment using the same method and a communication system using the same method.

BACKGROUND

A user equipment with device mobility often moves from one geographical location to another. Whenever a user equipment (UE) served under the domain of one base station migrates to the domain of another base station, the serving core network must have a way to keep track of the UE in case that the UE needs to be contacted by a phone call or a message. Since the UE could move between cells, paging all the cells in existence would be unnecessary and thus a way of keeping track of the UE by the serving core network.

Tracking areas are used to keep track of approximate locations of UEs served by a network. Each tracking area would have a unique global identity which is the tracking area identity (TAI). A tracking area would contain one or more cells, and a network would normally allocate to each UE a list known as a TAI list having one or more tracking areas. The TAI list is normally synchronized between a UE and a Mobility Management Entity (MME). When the network has to reach a UE such as when a call is incoming, the network would attempt to page the tracking areas in the TAIs list which was provided for the UE so that the UE could be located without the network having to page each and every possible cells in existence. Whenever a UE migrates to a tracking area which is not a tracking area of the TAI list, a TA update (TAU) would need to occur between the MME and the UE. Therefore, the TAI list is essentially a list of TA's where a mobile UE may move about without having to updating the MME.

FIG. 1 illustrates a first tracking area 101, a second tracking area 102, and a third tracking area 103. For LTE, these track areas 101, 102, 103 could be connected to a MME through a backhaul link such as a S1 interface. When the UE 104a first attach to one of the base stations or eNBs from the first tracking area 101, the MME would send a TAI list which includes tracking area 101. In step S121 when the UE 104a migrates to the second tracking area as UE 104b, a first TAU, or TAU1, would be performed as the MME would send a new TAI list including tracking areas 101 and 102. In step S122 when the UE 104b migrates to the third tracking areas as UE 104c, a second TAU, or TAU2, would be performed as the MME would send a new TAI list including track areas 101, 102, and 103 to the UE 104c. The TA updates as illustrates in FIG. 1 is summarized by the table 131 of FIG. 1.

In a live network, a UE's response for an ATTACH ACCEPT/GUTI REALLOCATION COMMAND/TRACKING AREA UPDATE ACCEPT messages is according to 3Gpp TS 24.301 specification. The version of the 24.301 specification at this time has mentioned that the MME would assign and include the TAI list the UE is registered to in the ATTACH ACCEPT/GUTI REALLOCATION COMMAND/TRACKING AREA UPDATE ACCEPT messages. FIG. 2A illustrates an ATTACH ACCEPT message content which contains a TAI list information element (IE) 201. FIG. 2B illustrates the content of the TAI list IE. The UE upon receiving an ATTACH ACCEPT message would delete its old TAI list and store the received TAI list.

Also, currently the UE is required to keep track of a list of forbidden tracking areas or a forbidden TAI list. Under section 5.3.2, it mentions " . . . The UE shall store a list of "forbidden tracking areas for roaming", as well as a list of "forbidden tracking areas for regional provision of service". These lists shall be erased when the UE is switched off or when the UICC containing the USIM is removed, and periodically (with a period in the range 12 to 24 hours). When the lists are erased, the UE performs cell selection according to 3GPP TS 36.304 [21]. One or more tracking areas is removed from the list of "forbidden tracking areas for roaming" in the UE, as well as the list of "forbidden tracking areas for regional provision of service" if, after a subsequent procedure e.g. attach procedure, tracking area updating procedure and GUTI reallocation procedure, one or more tracking areas in the lists is received from the network. If the UE has only one PDN connection established which is for emergency bearer services, the tracking areas shall not be removed from these lists if one or more tracking areas in the lists are received from the network. In S1 mode, the UE shall update the suitable list whenever an ATTACH REJECT, TRACKING AREA UPDATE REJECT, SERVICE REJECT or DETACH REQUEST message is received with the EMM cause #12 "tracking area not allowed", #13 "roaming not allowed in this tracking area", or #15 "no suitable cells in tracking area". Each list shall accommodate 40 or more TAIs. When the list is full and a new entry has to be inserted, the oldest entry shall be deleted.

Usually when a UE attempts to attach to a network, the UE would receive the ATTACH ACCEPT from a MME if the current tracking area is not in the forbidden list of the UE. However, currently it could be possible for a tracking area in the TAI list received from MME to be the same as a tracking area in the forbidden TAI list. In that case, when UE roams to the forbidden tracking area, the network might behave unpredictably. This issue would need to be resolved according to a different TAI list updating mechanism.

SUMMARY OF THE DISCLOSURE

Accordingly, the present disclosure is directed to a method for managing tracking area identity (TAI) list to be used by a user equipment (UE) and a UE using the same method.

The present disclosure proposes a method for managing a tracking area identity (TAI) list to be used by a user equipment, and the method would first include the UE storing a forbidden TAI list which describes a list of tracking areas in which the UE would not be able to connect with an evolved Node B (eNodeB) within the forbidden tracking area. The UE would then receive a first message which would include a TAI list assigned by a network control node such as a mobility management entity (MME). The TAI list would describe a list of tracking areas in which the UE would be able to roam about without having to perform a tracking area update (TAU) procedure. Also in the case of an incoming call, the network would only likely to page the eNBs within the tracking areas on the TAI list. In response to receiving the TAI list, the UE would determine whether the TAI list contain a first tracking area which is also on the forbidden TAI list. If that is the case, then the UE would revise either the TAI list or the forbidden TAI list to eliminate any overlaps of the two lists. The TAI list would then be updated if any changes had occurred.

In one of the exemplary embodiments, the UE would revise either the TAI list or the forbidden TAI list by eliminated said first tracking area from the TAI list.

In one of the exemplary embodiments, the UE would revise either the TAI list or the forbidden TAI list by eliminated said first tracking area from the forbidden TAI list.

In one of the exemplary embodiments, the updating the TAI list by the UE would further include removing all tracking areas which are on both the TAI list and the forbidden list from the TAI list, and synchronize the TAI list with a serving network.

In one of the exemplary embodiments, the abovementioned first message could be one of ATTACH ACCEPT or GUTI REALLOCATION COMMAND or TRACKING AREA UPDATE ACCEPT message in accordance with a version of the long term evolution (LTE) standards.

In one of the exemplary embodiments, the UE would determine whether the TAI list and the forbidden TAI list contain overlapping tracking areas during a tracking area update (TAU) event.

In one of the exemplary embodiments, synchronization of the forbidden TAI list between a UE and a MME would also occur.

The present disclosure also proposes a user equipment which would include at least but not limited to a storage medium for storing a forbidden TAI list, a transceiver for receiving a first message comprising a TAI list, and a processor coupled to the storage and the transceiver and is configured for determining whether the TAI list and the forbidden TAI list contain a first tracking area which is on both the TAI list and the forbidden tracking area list, revising either the TAI list or the forbidden TAI list such that the first tracking area is only on one of the TAI list or the forbidden TAI list, and then updating the TAI list after the TAI list has been altered.

The present disclosure also proposes a communication system which would include a least but not limited to a network control node and a user equipment (UE) which stores a forbidden TAI list. The network control node could be a mobility management entity (MME). The network control node may include a processor which is configured for transmitting a first message having a TAI list, and the user equipment could also include a processor which is configured for receiving through a transceiver a first message from the network control node. The network control node would determine from the first message whether the TAI list and the forbidden TAI list contain a first tracking area which is on both the TAI list and the forbidden tracking area list. The network control node would revise either the TAI list or the forbidden TAI list such that the first tracking area is only on one of the TAI list or the forbidden TAI list. The UE may then update the TAI list after the TAI list has been revised.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
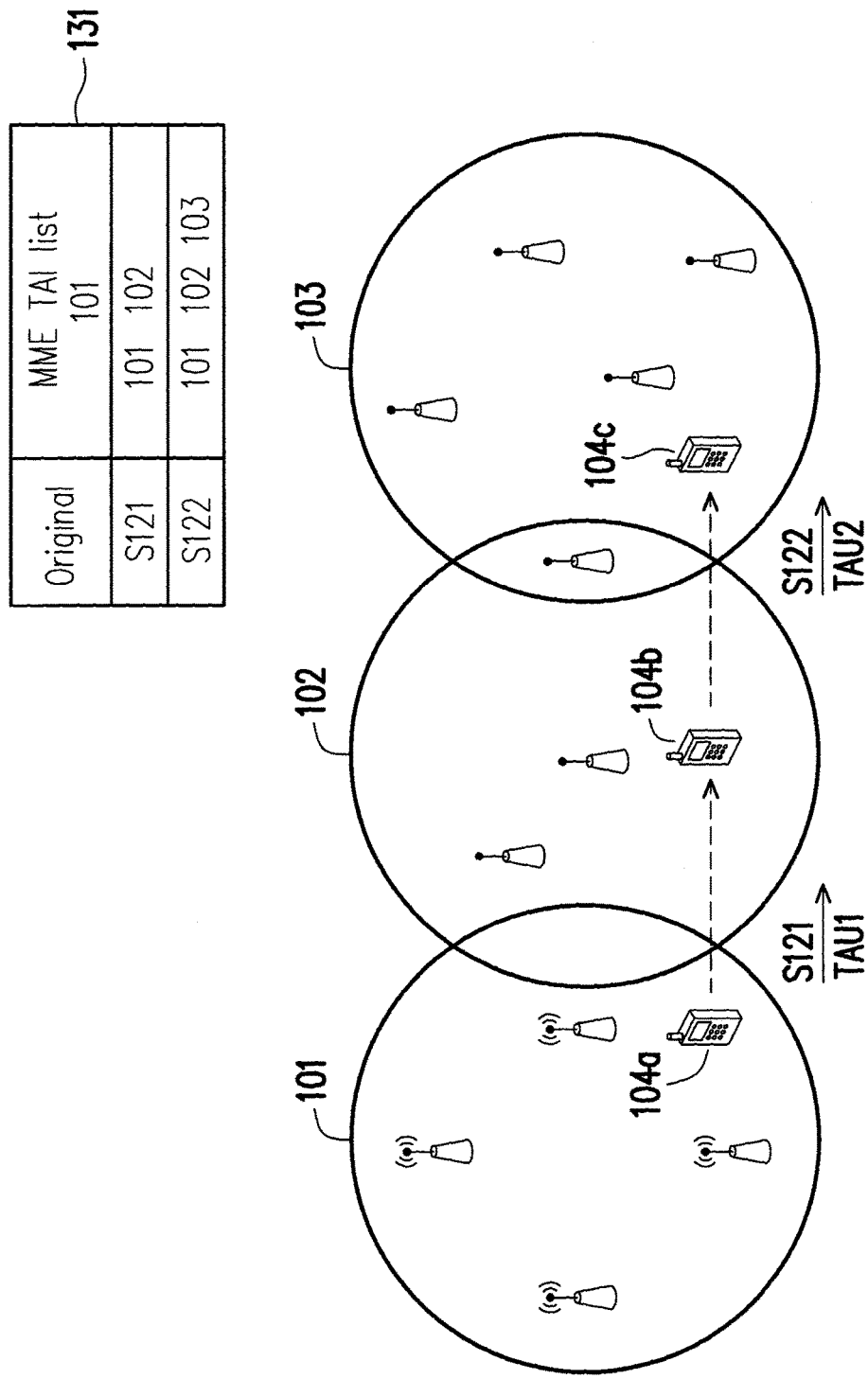
FIG. 1 is an example which illustrates the concept of tracking areas and tracking area updates based on a current LTE standard.
Figures 2A, 2B:
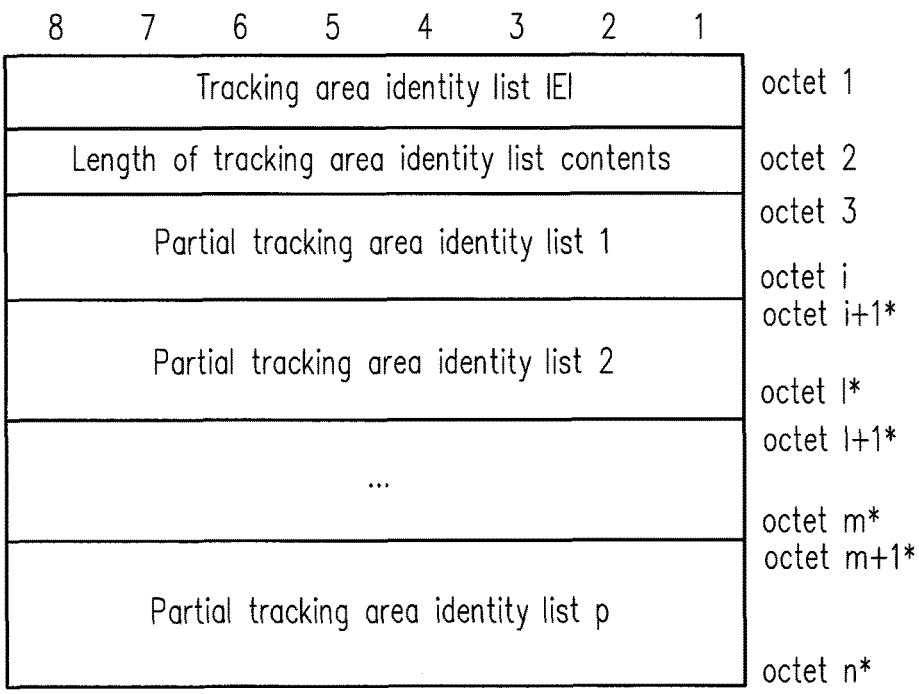
FIG. 2A illustrates the content of an ATTACH ACCEPT message based on a current LTE standard.
FIG. 2B illustrates the contents of the tracking area identity list information element based on a current LTE standard.

Reference will now be made in detail to the present preferred embodiments of the disclosure, examples of which are illustrated in the accompanying drawings. Wherever possible, the same reference numbers are used in the drawings and the description to refer to the same or like parts.

The present disclosure proposes a method for managing a tracking area identity (TAI) list in a wireless communication system. Typically, a wireless communication system would use a list of TAI to keep track of a UE with mobility as a UE would be assumed to be within the tracking areas on the list. For the present disclosure, a UE would receive a list from a MME when it is first attached to the MME, and the UE would perform a tracking area update (TAU) when the UE migrates from one tracking area to another tracking area which is not already on the list of TAI. The UE would also store a forbidden TAI list which lists the identity of tracking areas under which wireless services are assumed to be unavailable for the UE. Therefore, whenever a MME transmits a message such as the ATTACH ACCEPT or GUTI REALLOCATION COMMAND or TRACKING AREA UPDATE ACCEPT, the message would contain a TAI List assigned for the UE. When the UE receives the TAI list, the UE would be expected to replace the old TAI list previously stored in the UE. If the UE has determined that the TAI list received from the MME contains a tracking area which is also on the forbidden TAI list, the UE would modify either the TAI list received from the MME or the forbidden TAI list stored in the UE to ensure that there does not exist a tracking area which is on both lists. In one of the exemplary embodiments, the UE would remove the TAI which is found on both the TAI list received from MME and the TAI forbidden list stored in UE from the TAI list received from the MME. In another exemplary embodiment, the UE would leave the TAI list received from the MME unchanged but remove the TAI which is found on both lists (i.e. the TAI list received from MME and the TAI forbidden list stored in UE) from the forbidden TAI list. After the revision of the TAI list is complete, the UE may synchronize with the MME either the updated TAI list or the updated TAI forbidden list.

Figure 3:
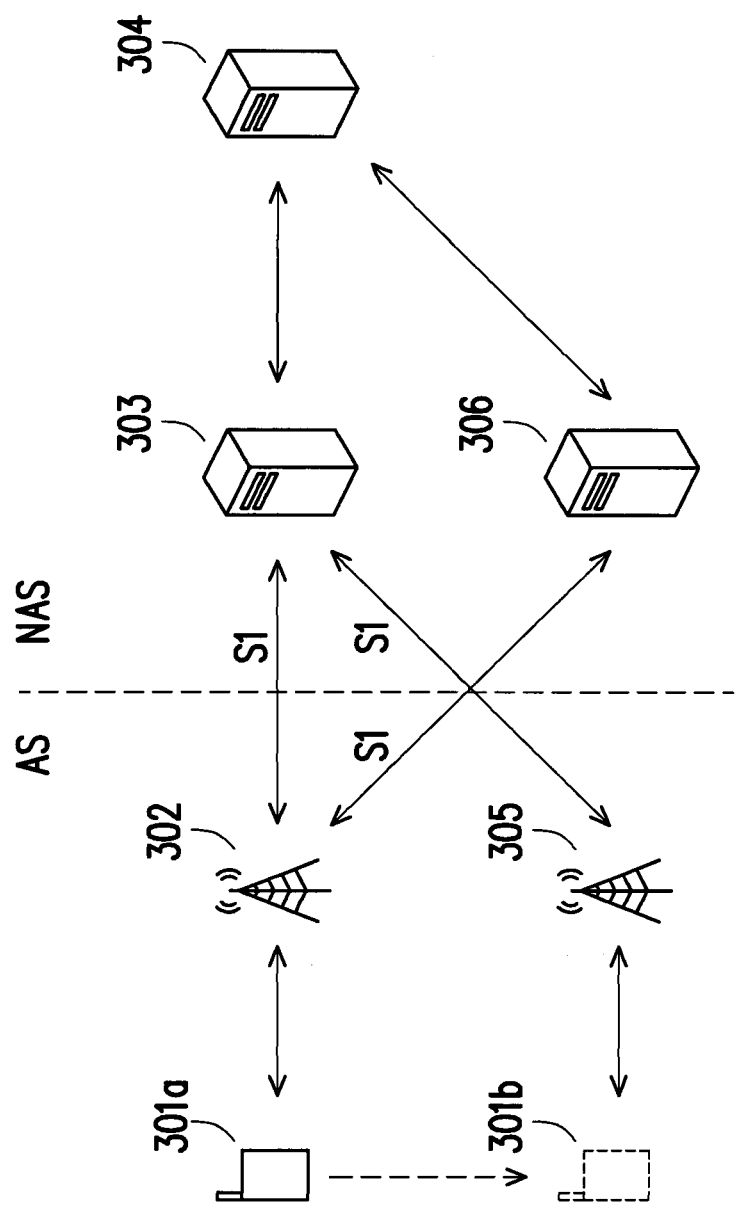
FIG. 3 illustrates an exemplary communication system which utilizes the proposed TAI list managing method based on a current LTE standard.
Figure 4:
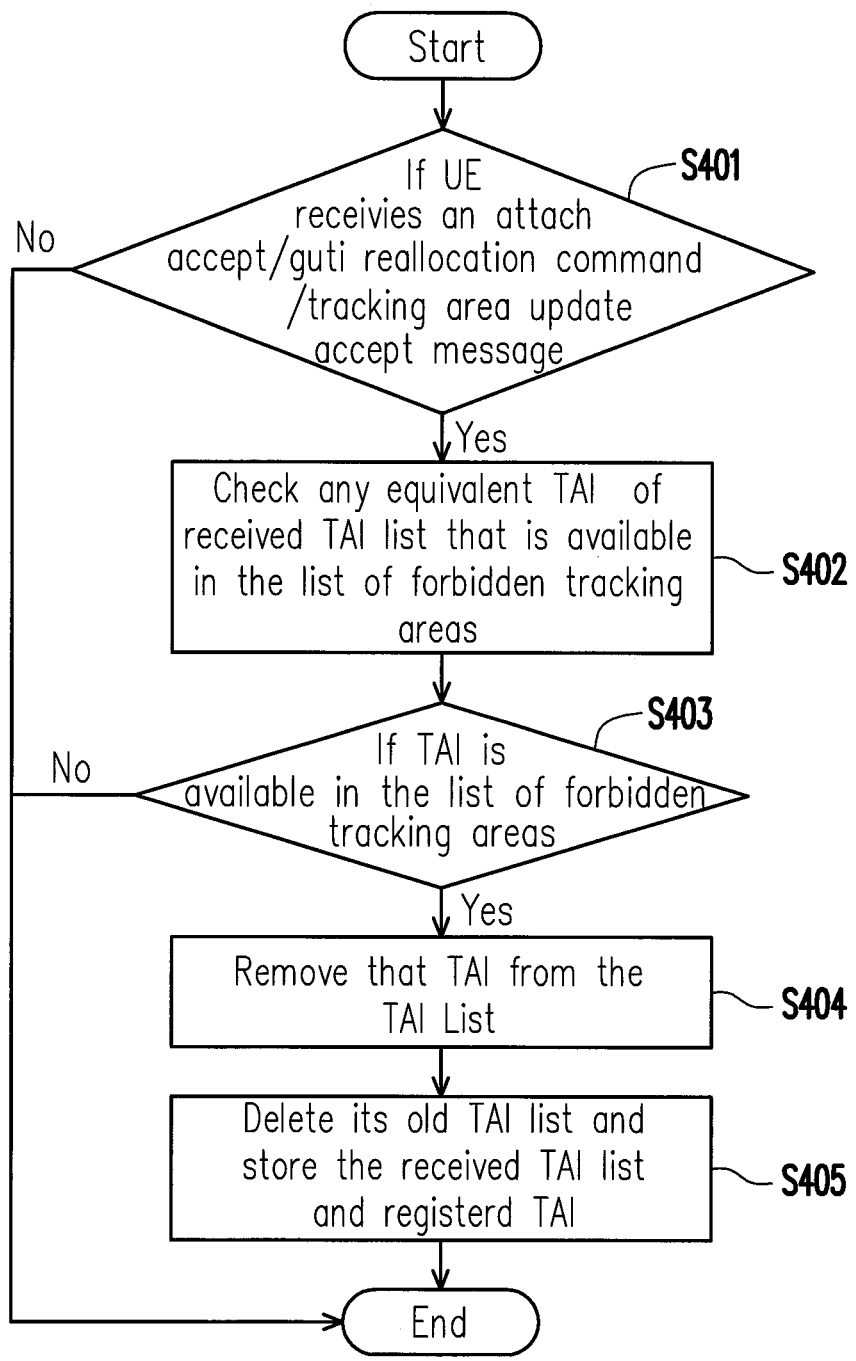
FIG. 4 is a flow chart which illustrates the proposed TAI list managing method in accordance with one of the embodiments of the present disclosure.
Figure 5:
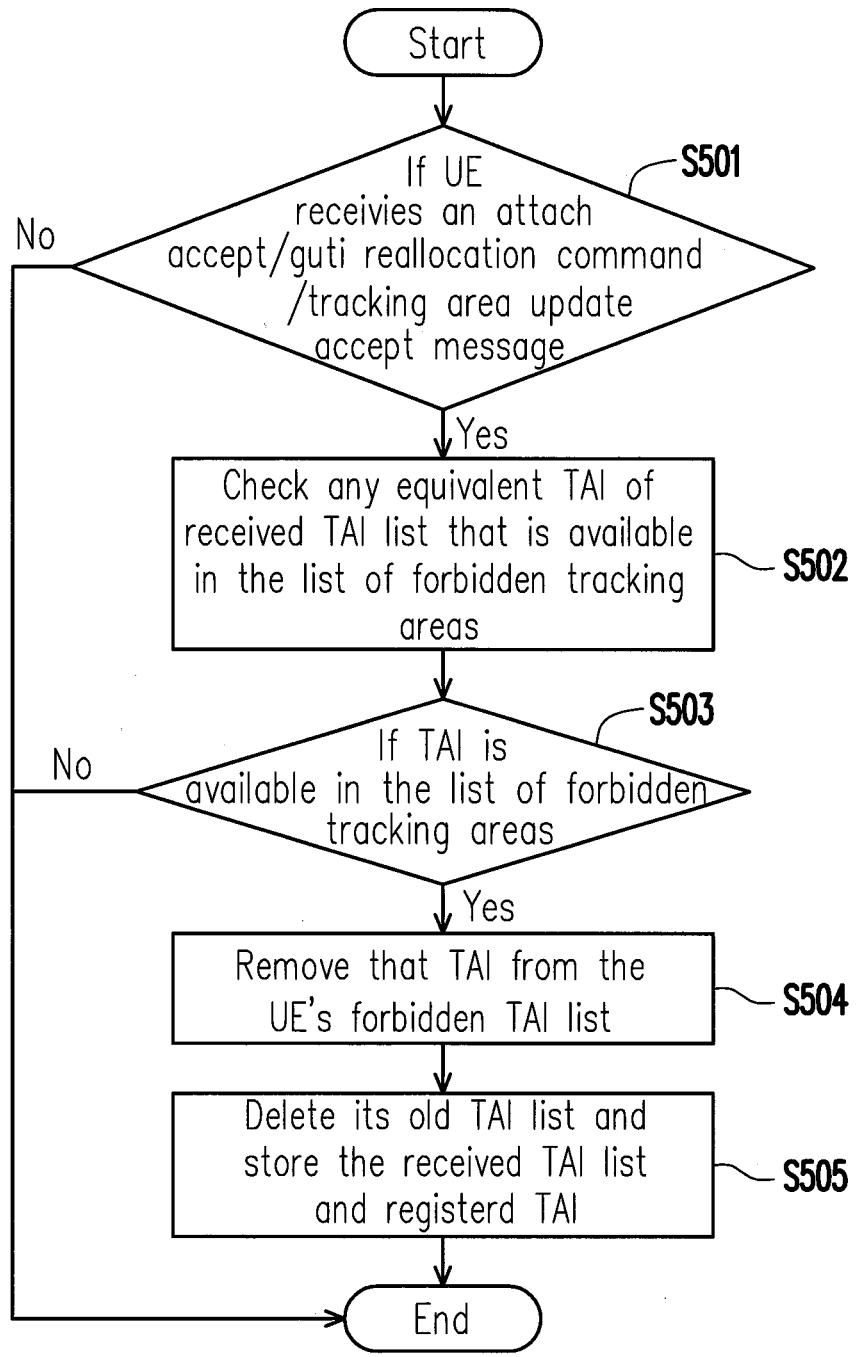
FIG. 5 is a flow chart which illustrates the proposed TAI list managing method in accordance with one of the embodiments of the present disclosure.

FIG. 3 illustrates an exemplary communication system which utilizes the proposed TAI list managing method based on a current LTE standard. In a typical communication system, a UE (e.g. 301a) would be connected to a radio access network through an eNB (e.g. 302 or 305) which in turn connects to the non-access stratum (NAS) part of the network to a MME (e.g. 303 or 306) via a backhaul link such as a S1 interface for a LTE communication system. The eNB (e.g. 302) could be connected to one or the multiple MMEs (e.g. 303, 306) which could be connected to a home subscriber server (HSS, e.g. 304) for charging purposes. When a UE performs a TAU, the UE may receive a TAI list embedded in an ATTACH ACCEPT or GUTI REALLOCATION COMMAND or TRACKING AREA UPDATE ACCEPT message. FIGS. 4 & 5 describe the proposed TAI list managing method in response to receiving the ATTACH ACCEPT or GUTI REALLOCATION COMMAND or TRACKING AREA UPDATE ACCEPT message.

Referring to FIG. 4, in step S401, the UE may receive the ATTACH ACCEPT or GUTI REALLOCATION COMMAND or TRACKING AREA UPDATE ACCEPT message. In case that such message has been received, the UE would obtain a TAI list assigned to the UE from a MME. In step S402, using the TAI list which was received, the UE would check the received TAI list to determine if there is any tracking area that is also on the forbidden TAI list stored in the UE. In step S403, assuming that a first tracking area has been found to exist in both the TAI list received from the MME and also on the forbidden TAI list, then in step S404, the UE would remove the TAI corresponding to the first tracking area from the TAI list which was received from the MME to generate a modified TAI list. In step S405, the UE would delete the previous TAI list which has been stored in the UE with the modified TAI list and registered TAI. The registered TAI may refer to the newly added TAI of the new tracking area when the UE migrates to a different tracking area and performs the tracking area update. The network and the UE may then synchronize the modified TAI list with each other.

FIG. 5 is another embodiment which is alternative to FIG. 4. Referring to FIG. 5, in step S501, the UE may receive the ATTACH ACCEPT or GUTI REALLOCATION COMMAND or TRACKING AREA UPDATE ACCEPT message. In case that such message has been received, the UE would obtain a TAI list assigned to the UE from a MME. In step S502, using the TAI list which was received, the UE would check the received TAI list to determine if there is any tracking areas that is also on the forbidden TAI list stored in the UE. In step S503, assuming that a first tracking area has been found to exist in both the TAI list received from the MME and also on the forbidden TAI list, then in step S504, the UE would remove the TAI corresponding to the first tracking area from the forbidden TAI list which was last stored in the UE. In step S505, the UE would delete the previous TAI list which has been stored in the UE with the new TAI list received from the MME. In another embodiment, the network and the UE may also synchronize the modified forbidden TAI list which was stored in the UE with each other.

According to another exemplary embodiment, the MME would eliminate the conflict between the TAI list of a UE and a forbidden TAI list of the same UE. The UE would perform the tracking area update (TAU) when the UE migrates from the first tracking area to a second tracking area. Before, the UE would receive a TAI list from a MME, the UE would transmit to the MME its current forbidden TAI list. In response to receiving the forbidden TAI list from the UE, the MME would check whether there is a TAI in common between the TAI list of the UE and the forbidden TAI list from the UE. When the TAI list of the UE and the forbidden TAI list from the UE have a TAI in common after a comparison has been made by the MME, the MME would either remove the common TAI from the TAI list of the UE or remove the common TAI from the forbidden TAI list. The MME would then update the TAI list of the UE by adding the newly registered second tracking area to the updated TAI list of the UE and synchronizing the updated TAI list of the UE with the UE.

Figure 6:
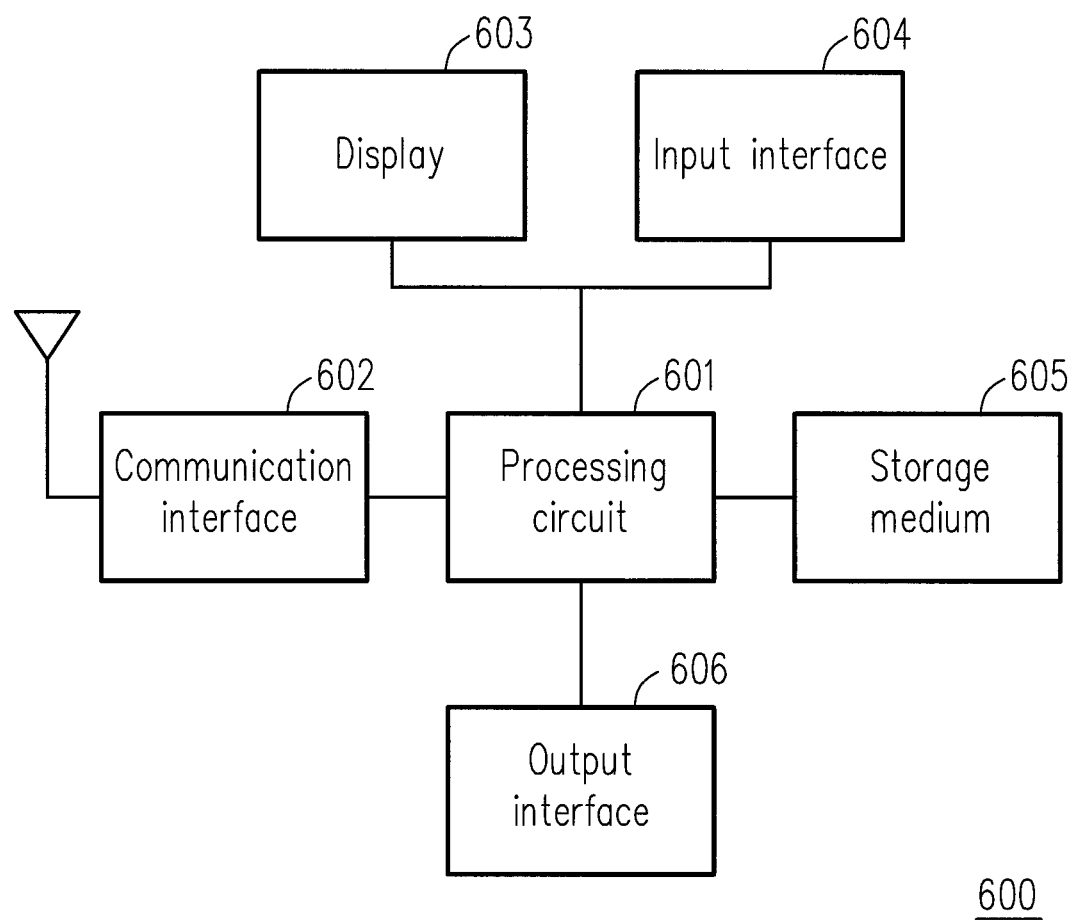
FIG. 6 illustrates an exemplary user equipment which utilizes the proposed method for managing a TAI list in terms of functional block diagrams.

FIG. 6 illustrates an exemplary user equipment 600 which utilizes the proposed method for managing a TAI list in terms of functional block diagrams. The user equipment 600 would include at least but not limited to a processing circuit or processor 601. The processor would be coupled to a communication interface 602, a display 603, an input interface 604, a storage medium 605, and an output interface 606. The processor 601 may also include a controller. The processor may include a micro-controller, a North Bridge, a South Bridge, a field programmable array (FPGA), a programmable logic device (PLD), an application specific integrated circuit (ASIC), or other similar device, or a combination thereof. The processor 601 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device and would execute functions related to the proposed method as illustrated in FIGS. 3-5 of the present disclosure.

The communication interface 602 could include components such as a protocol unit which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication interface circuit 602 would also provide wireless access for the device 600 by including components at least but not limited to a transmitter circuit and a receiver circuit.

The display 603 could include a touch screen and may contain a display such as a liquid crystal display (LCD), a light-emitting diode (LED) display, a field emission display (FED) or other types of display. The input interface 604 could be, for example, an input device such as a mouse, a keyboard, a joystick, a wheel, and so forth. The storage medium 605 could volatile or permanent memories which would store buffered or permanent data such as the TAI list, forbidden TAI list or compiled programming codes used to execute functions of the exemplary mobile electronic device. The output interface 606 may include a speaker, LEDs, and etc. . . .

The term "user equipment" (UE) in this disclosure could be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

In view of the aforementioned descriptions, the present disclosure is suitable for being used in a wireless communication system and by a user equipment to ensure that a same tracking area is not recorded in both the TAI list receives from a MME and also in the forbidden TAI list so that unexpected behavior would not occur in the communication system.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for managing a tracking area identity (TAI) list to be used by a user equipment (UE), and the method comprising:
    storing, by the UE, a forbidden TAI list;
    receiving, by the UE, a first message comprising a TAI list from a mobile management entity (MME), wherein the first message is one of ATTACH ACCEPT or GUTI REALLOCATION COMMAND;
    determining, by the UE, whether the received TAI list and the forbidden TAI list contain a first tracking area which is on both the received TAI list and the forbidden tracking area list;
    in response to obtaining the first tracking area through comparing the TAI list received from the first message and the forbidden TAI list stored in the UE, revising, by the UE, the received TAI list by removing the first tracking area from the received TAI list such that the first tracking area is only on the forbidden TAI list;
    updating, by the UE, a previous TAI list stored in the UE by using the revised TAI list not including the first tracking area; and
    synchronizing, by the UE, the revised TAI list with the MME of a serving network.

2. The method of claim 1, wherein updating the previous TAI list further comprises:
    removing all tracking areas which are on both the TAI list and the forbidden list from the previous TAI list.

3. The method of claim 1, wherein determining whether the TAI list and the forbidden TAI list contain the first tracking area which is on both the TAI list and the forbidden tracking area list comprises:
    determining whether the TAI list and the forbidden TAI list contain overlapping tracking areas during a tracking area update (TAU) event.

4. The method of claim 1 further comprising: updating the forbidden TAI list and synchronizing the forbidden TAI list with a serving network.

5. A user equipment comprising:
    a storage medium for storing a forbidden TAI list;
    a transceiver for receiving a first message comprising a TAI list from a mobile management entity (MME), wherein the first message is one of ATTACH ACCEPT or GUTI REALLOCATION COMMAND; and
    a processor coupled to the storage and the transceiver and configured for determining whether the received TAI list and the forbidden TAI list contain a first tracking area which is on both the received TAI list and the forbidden tracking area list, in response to obtaining the first tracking area through comparing the TAI list received from the first message and the forbidden TAI list stored in the user equipment, revising the received TAI list by removing the first tracking area from the received TAI list such that the first tracking area is only on the forbidden TAI list, and updating a previous TAI list stored in the UE by using the revised TAI list not including the first tracking area, and synchronizing the revised TAI list with the MME of a serving network.

6. The user equipment of claim 5, wherein the processor is configured for updating the previous TAI list further comprises removing all tracking areas which are on both the TAI list and the forbidden list from the previous TAI list.

7. The user equipment of claim 5, wherein the processor is configured for determining whether the TAI list and the forbidden TAI list contain the first tracking area which is on both the TAI list and the forbidden TAI list comprises determining whether the TAI list and the forbidden TAI list contain overlapping tracking areas during a tracking area update (TAU) event.

8. The user equipment of claim 5, wherein the processor is further configured for comprising: updating the forbidden TAI list and synchronizing the forbidden TAI list with a serving network.

9. A communication system comprising a network control node and a user equipment (UE) which stores a forbidden TAI list, wherein the network control node is configured for transmitting a first message comprising a TAI list, wherein the first message is one of ATTACH ACCEPT or GUTI REALLOCATION COMMAND; and the UE is configured for determining from the first message whether the received TAI list and the forbidden TAI list contain a first tracking area which is on both the received TAI list and the forbidden tracking area list, in response to obtaining the first tracking area through comparing the TAI list received from the first message and the forbidden TAI list stored in the UE, revising the received TAI list by removing the first tracking area from the received TAI list such that the first tracking area is only on the forbidden TAI list, and updating a previous TAI list stored in the UE by using the revised TAI list not including the first tracking area, and synchronizing the revised TAI list with the network control node of a serving network.

10. The communication system of claim 9, wherein the UE updating the previous TAI list comprising removing all tracking areas which are on both the TAI list and the forbidden list from the previous TAI list.

11. The communication system of claim 9, wherein the UE determining whether the TAI list and the forbidden TAI list contain the first tracking area which is on both the TAI list and the forbidden tracking area list comprises:
   determining whether the TAI list and the forbidden TAI list contain overlapping tracking areas during a tracking area update (TAU) event.

* * * * *